June 23, 1936.  H. J. STEGEMAN  2,045,497
LAWN MOWER
Filed April 21, 1934  4 Sheets-Sheet 1

INVENTOR
Henry J. Stegeman
BY
Gifford, Scull & Burgess
ATTORNEYS.

June 23, 1936.  H. J. STEGEMAN  2,045,497
LAWN MOWER
Filed April 21, 1934  4 Sheets-Sheet 2

INVENTOR
Henry J. Stegeman
BY
Gifford, Scull & Burgess
ATTORNEYS

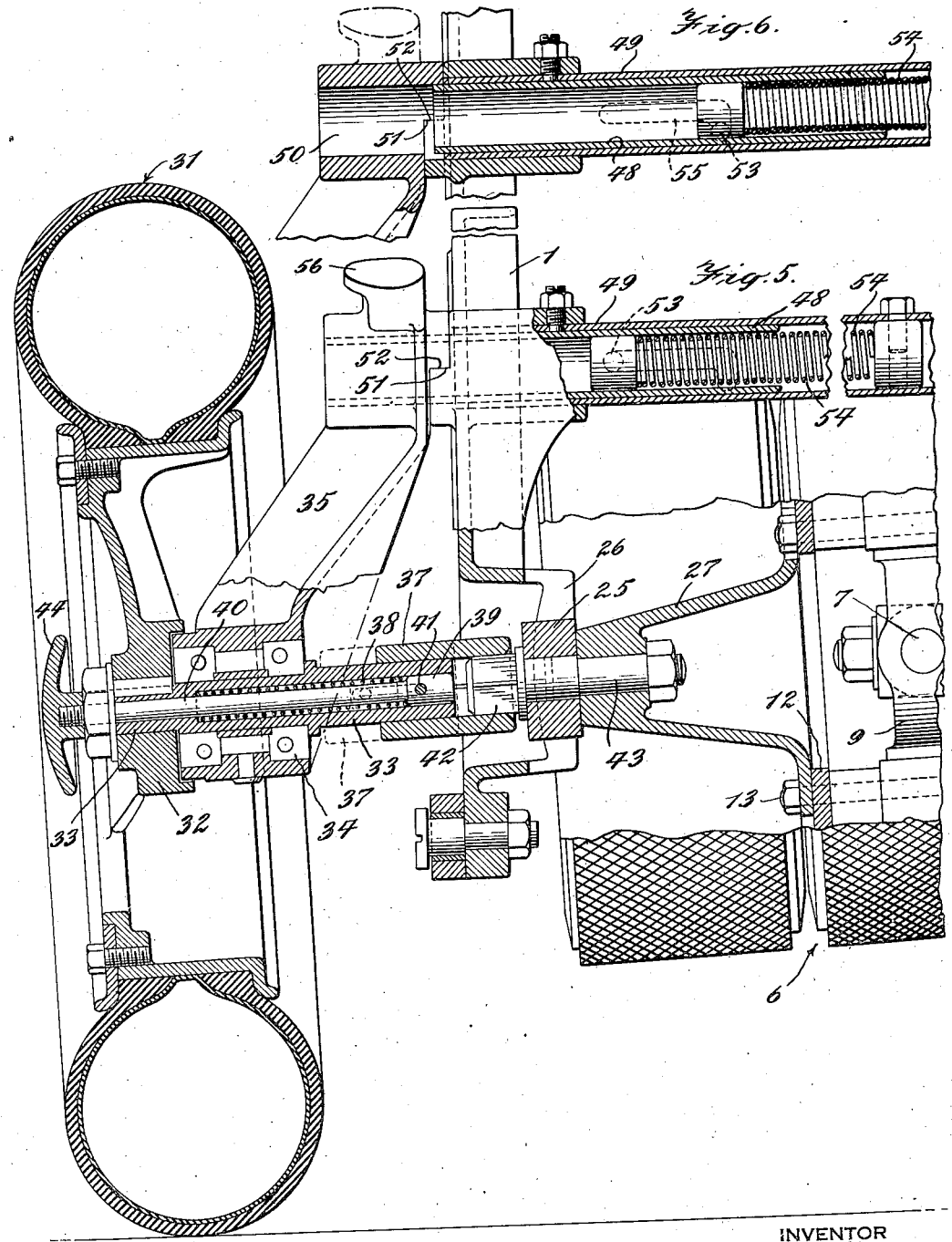

June 23, 1936.　　　H. J. STEGEMAN　　　2,045,497
LAWN MOWER
Filed April 21, 1934　　　4 Sheets-Sheet 4

INVENTOR
Henry J. Stegeman
BY
Gifford, Scull & Burgess
ATTORNEYS

Patented June 23, 1936

2,045,497

UNITED STATES PATENT OFFICE 2,045,497

LAWN MOWER

Henry J. Stegeman, Fairfield, Conn., assignor to The Locke Steel Chain Company, Bridgeport, Conn., a corporation of Connecticut Application April 21, 1934, Serial No. 721,759

32 Claims. (Cl. 56—7)

This invention relates to certain changes made in the structure disclosed and claimed in my copending application Ser. No. 634,485, which has since matured into Patent No. 1,994,929, granted March 19, 1935, those changes being what I now deem to be improvements upon the structure of that application. The novelty will be best understood from the following description and the annexed drawings, in which I have shown selected embodiments of the various features and in which:

Fig. 5 is a view, partly in section and partly in elevation, taken from the right of Fig. 4;

Fig. 6 is a fragmentary view of the same structure appearing in Fig. 5, but showing the parts in different positions;

Figure 1:
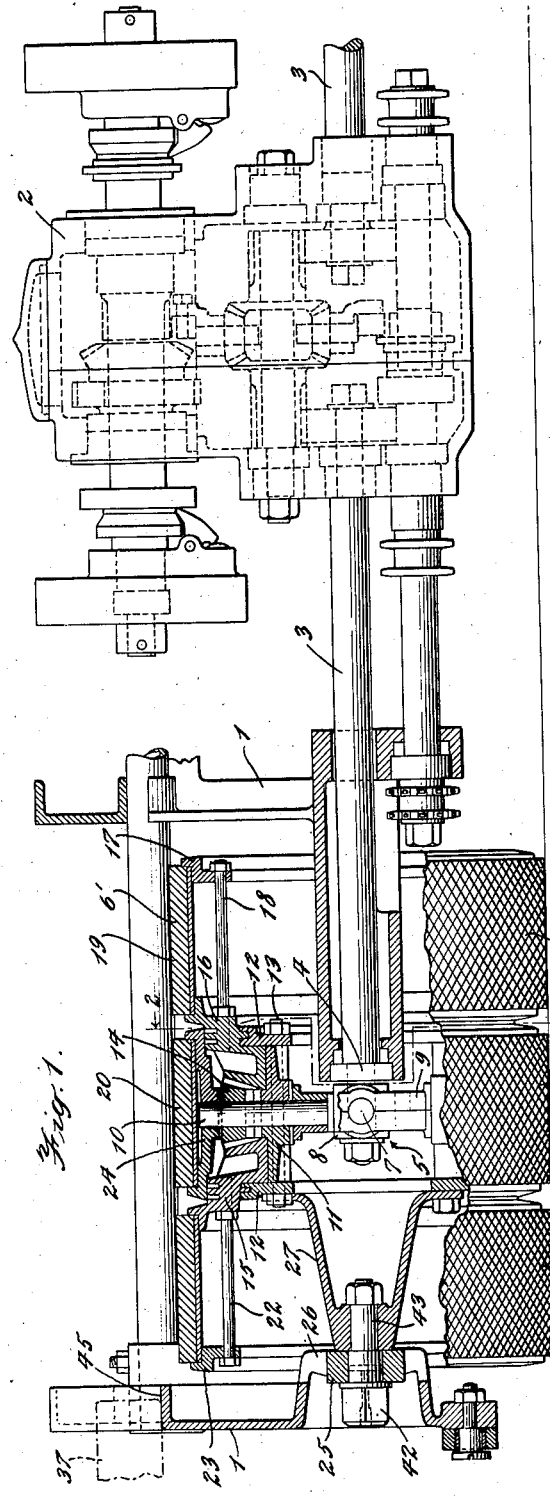
Fig. 1 is a view partly in elevation and partly in section, and showing a portion of a lawn mower.

Referring first to Figs. 1 to 6, inclusive, the novel features are shown as applied to a machine of the general type disclosed in my aforesaid Patent No. 1,994,929, although, of course, they may be applied to other machines where found suitable. The machine comprises a frame 1 including a housing 2 in which is disposed a gear arrangement for driving various parts of the machine from a suitable motor. Further details of the machine are not necessary to an understanding of this invention, and therefore have been omitted from the drawings. The gearing may include a suitable differential to operate two shafts 3 disposed in alignment with each other and upon each of which is mounted a ground-engaging roller. Since a similar construction is used in mounting each roller upon its shaft, only one such roller is shown herein, it being understood that a similar roller is used on the other side of the machine.

The shaft 3 has a bearing 4 in the frame, and disposed outwardly from the bearing 4 the shaft has a universal connection 5 to the roller indicated generally at 6. This connection may be of any suitable and usual form, here shown as comprising two oppositely disposed pins 7 secured to a block 8 which is keyed to the shaft. Rotatably mounted upon the pins 7 is a ring 9, and rotatably mounted in this ring are shafts 10 extending in opposite directions from the center of the shaft 3 but in alignment with each other. These shafts 10 are disposed at right angles to the pins 7 and, with those pins, complete the universal connection between the shaft 3 and the roller 6. As will be seen, these shafts 10 have bearings in the hub 11 of the roller.

The roller has three sections disposed side by side longitudinally of the shaft 3, and the universal connection between that shaft and the roller is preferably disposed at the central section.

The hub 11 has on opposite sides thereof plates 12 connected together by bolts 13 which serve to unite them to the hub. Secured to the shafts 10 are beveled pinions 14 meshing with teeth on annular ring gears 15 and 16 disposed on opposite sides of the longitudinal center of the central section of the roller. The section nearest the center of the machine, and which for convenience will be referred to as 6', has a plate 17 cooperating with the ring 16 and fastened thereto by bolts 18 to clamp therebetween a tread portion 19 of the same diameter as the thread 20 on the central section. The outermost section 6'' is likewise formed of a tread 21 secured in place by bolts 22 passing through openings in the ring 15 and the plate 23. The tread 20 of the central section is supported on a head 24 integral with the hub 11 and disposed outwardly of the beveled gears 14 and carrying the shafts 10. The ring gears 15 and 16 move between the edges of the plates 12 and the head 24 as the gears rotate on the hub.

The principal result of this arrangement is that, when turning the machine, the speeds of the three sections can vary and thus avoid slippage, because of the differential connection between them. The above arrangement will be seen to be quite flexible. Moreover, as the roller proceeds over the ground, it can readily tip both in a vertical and horizontal plane. That is to say, it can accommodate itself to varying contours of the ground. Moreover, as it thus accommodates itself to the contour of the ground, the various sections will accommodate themselves to each other so as to avoid, or at least to greatly reduce, any slippage of the roller itself on the ground. The relative motion between the various sections is made possible by the beveled gear arrangement, which includes the pinions 14 and the teeth on the ring gears 15 and 16.

Preferably, movement in a horizontal plane is limited by a pilot block 25 moving in a guideway 26 in part of the frame, as the roller conforms to the contour of the ground.

The block 25 may be secured to the hub of the central section as by an extension 27.

The machine comprises one or more cutter units which may be operated from the motor and which may be raised or lowered in a manner more fully described in my aforesaid copending application. For example, in Fig. 4, there is indicated a cable 28 running over an idler 29 and which may lift one of the cutter units 30, of which several are indicated.

When the machine is not in operation, and when it is desired to transport it to another location, it is desirable to lift the cutter units and the ground-engaging rollers out of contact with the ground, as set forth in my aforesaid copending application. One of the novel features of this application involves an arrangement for supporting the machine upon wheels permanently mounted upon the machine and which can be used for such transportation. Normally, two such wheels will be used, one on either side of the machine, but for the sake of simplicity, only one such wheel has been shown and will be described in detail.

The wheel is designated generally 31 and may be of the pneumatic tire type illustrated and comprising a hub 32 keyed to the shaft 33 which is rotatably supported in a suitable bearing 34 on a sub-frame 35.

This sub-frame 35 is pivoted to the frame 1 at 36 and may be held in either one of two positions, in one of which the shaft 33 is clutched to the driving mechanism of a roller 6, with the rollers out of engagement with the ground, and in the other of which the roller is in engagement with the ground and the wheel is held in inoperative position where it may be carried on the frame of the machine.

Referring to Fig. 5, it will be seen that the shaft 33 is provided with a sliding clutch element 37, here shown in the form of a sleeve mounted to slide on the shaft, and spring actuated by a compression spring 38 towards the right of this figure. The spring 38 is mounted within a bore in the shaft 33 and reacts between the bottom of that bore and a head 39 on a pull rod 40. This head has a pin 41 extending through opposed slots in the wall of the bore and secured to the sleeve 37.

The sleeve 37 may have any suitable internal shape corresponding to that of a clutch element 42 on a stub shaft 43 secured to the hub of the central section of the roller 6 so that rotation of this central section, by the driving mechanism of the machine, may cause rotation of the wheel.

By the arrangement just described, it will be seen that the roller 6 may be lifted out of engagement with the ground by any suitable means (not shown). The sub-frame 35 then may be swung to the position shown in full lines in Figs. 4 and 5, in which the stub shaft 43 and the shaft 33 will be in alignment and the clutch elements may be caused to engage to form a driving connection therebetween. When the connection is thus made, it will be seen that the adjacent ground-engaging roller will be kept out of contact with the ground and will serve as an intermediate driving connection from the machine to the wheel, so that the wheel is positively driven to transport the machine.

Figure 2:
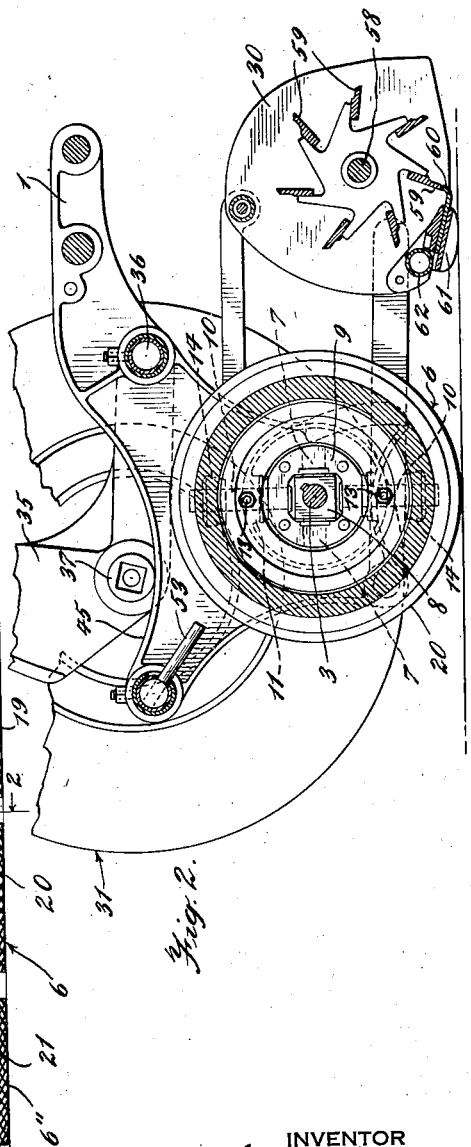
Fig. 2 is a section on the line 2—2 of Fig. 1.
Figure 3:
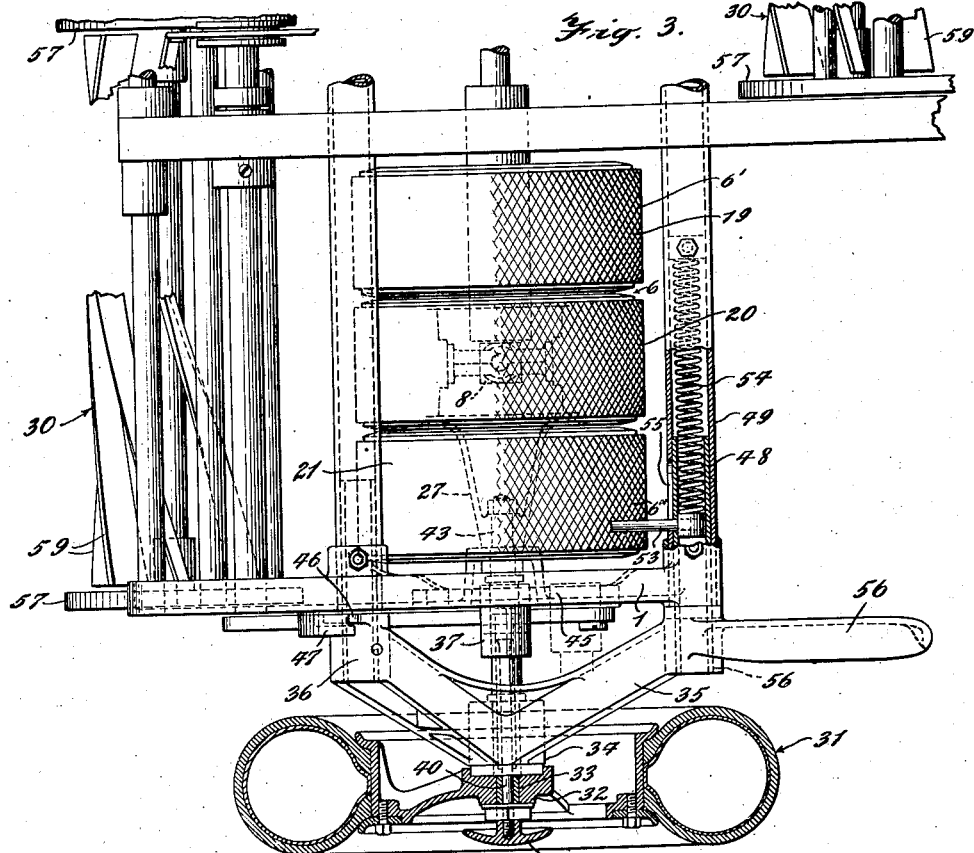
Fig. 3 is a fragmentary plan view of a portion of the structure appearing in Fig. 1, with certain structure added thereto.
Figure 4:
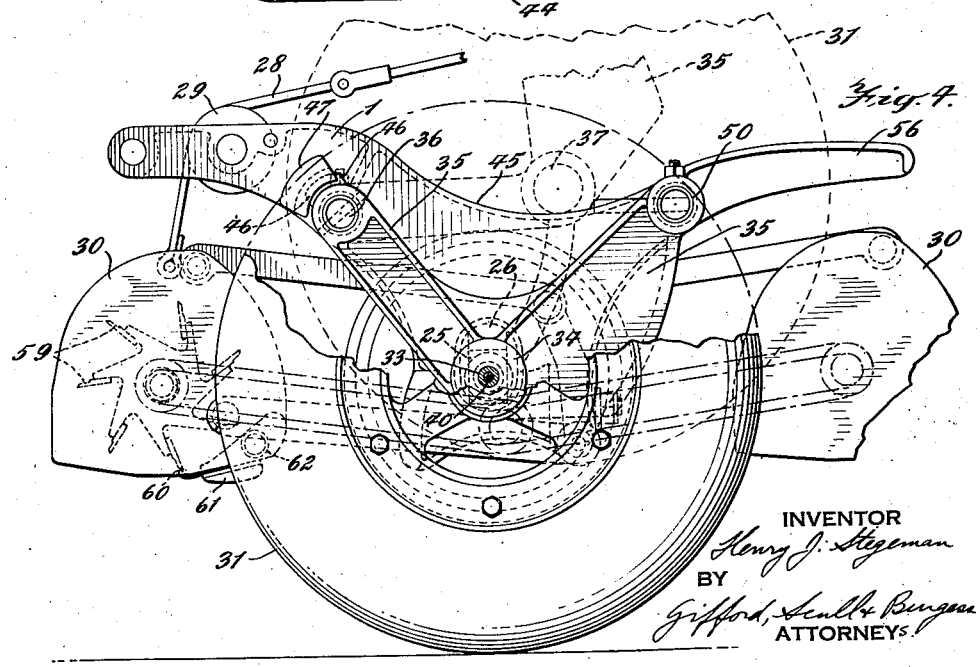
Fig. 4 is an elevation of the structure appearing in Fig. 3 as viewed from the bottom of that figure.

When it is desired to operate the machine again as a mower, the sleeve 37 is retracted to the position shown in dotted lines in Fig. 5, this being conveniently done by means of a handle 44 secured to the pull rod 40, and then the sub-frame may be swung to the position shown in dotted lines in Fig. 4 and in full lines in Fig. 2. Then the handle may be released and the sleeve 37 may engage the top edge 45 of the frame 1, thus holding the sub-frame in raised position. The sleeve 37 may, during movement of the sub-frame on its pivot, ride along the outer face of the frame 1 until its top edge 45 is reached. During this movement also the sub-frame is guided by means of a projection 46 on the sub-frame adjacent the pivot 36 moving within a guide member 47 on the main frame 1.

When the wheel 31 is in position to support the machine, an additional support between the wheel and the main frame is formed by means of an anchor 48 slidably mounted in a tubular member 49 forming part of the main frame 1. This anchor may be received within a bore 50 in the sub-frame 35, this bore being caused to register with the tubular member 49 by means of a stop 51 on the main frame engaging a stop 52 on the sub-frame. The anchor may be retracted by means of a handle 53 against the action of a spring 54 to the position shown in Fig. 6, where it may be held by the handle being engaged in the offset portion of a bayonet slot 55, as indicated in Fig. 6. After the sub-frame is brought to the position shown in full lines in Figs. 4 and 5, the handle may be released from the offset portion of the bayonet slot, and then the spring will cause the anchor to enter the bore 50. A suitable handle 56 is provided for manipulating the sub-frame and the parts carried thereby.

Figure 7:
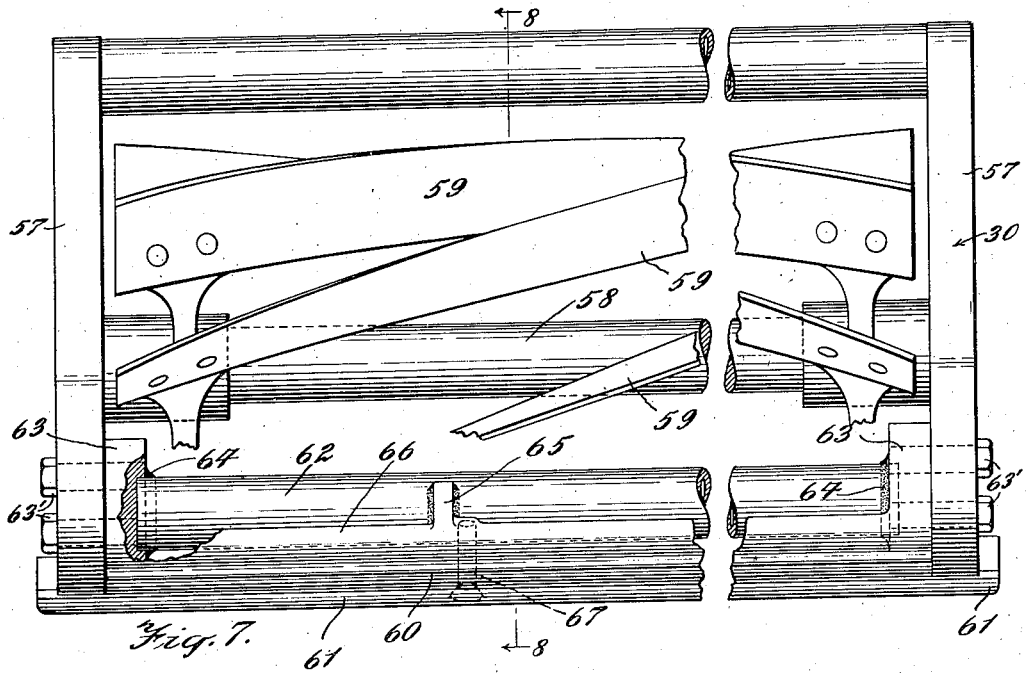
Fig. 7 is a fragmentary view of a cutter unit showing one of the novel features.
Figure 8:
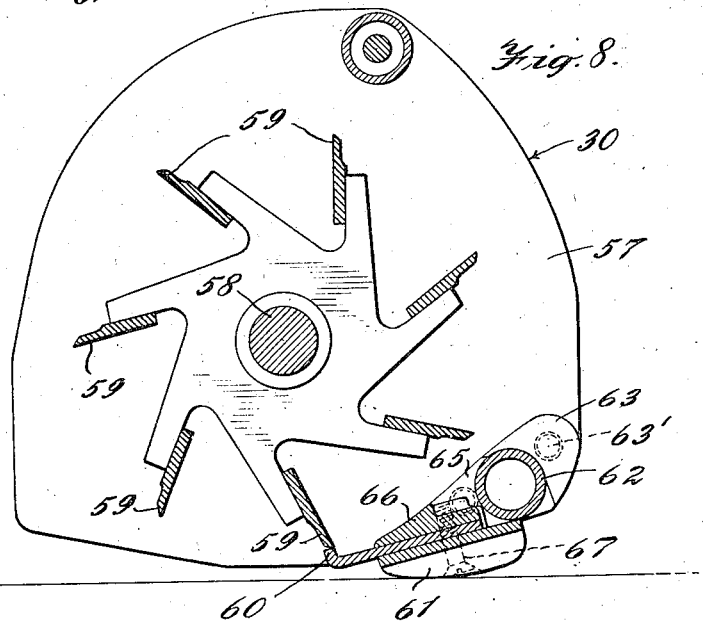
Fig. 8 is a section on the line 8—8 of Fig. 7.

Turning now to Figs. 7 and 8, I have shown therein a cutter 30 formed of two side frames 57 supporting the shaft 58 of a rotary cutting element, this element comprising the usual blades 59 adapted to cooperate with a stationary blade 60 in a well-known manner. This blade 60 is supported adjacent the ground, and the cutter is supported at least in part on the ground by means of a shoe 61. In order to secure the shoe and stationary blade to the cutter side frames in an efficient manner, I connect the side frames by an anchor member, here shown as a tube 62 disposed in end brackets 63 secured to the side frames as by screws 63'. The tube is preferably welded to the end brackets 63, as indicated at 64, to make an integral structure. Extending forwardly from the anchor member is a plurality of intermediate brackets 65 preferably welded to the anchor member, and preferably integral with a clamping member 66, which is likewise integral with the end brackets 63. The stationary blade 60 is secured between the clamping member 66 and the shoe 61 as by screws 67.

The above-described arrangement is one which takes up the stresses with a minimum of material. The principal force exerted on the cutting edge of the stationary blade is a vertically downward one, and adjacent that edge there is little space available for a member to resist that force. By placing the anchor member rearwardly of the cutting edge and hanging the blade therefrom by forwardly extending integral brackets, it is possible to adequately support the blade and at the same time permit its close approach to the ground.

While I have shown the invention as embodied in specific forms, it is to be understood that various changes in details may be made without departing from the scope of the invention, and I therefore do not intend to limit myself except by the appended claims.

I claim:

1. A lawn mower comprising a frame having a fixed bearing thereon, a shaft rotatably mounted in said bearing, a ground-engaging roller extending generally lengthwise of said shaft, and a pivot extending transversely of the shaft and supporting said roller on said shaft, thereby permitting tipping of the roller parallel to said shaft, said roller being formed in a plurality of longitudinal sections rotatable about said shaft relatively to each other.

2. A lawn mower comprising a frame having a fixed bearing thereon, a shaft rotatably mounted in said bearing, a ground-engaging roller extending generally lengthwise of said shaft, a pivot extending transversely of the shaft and supporting said roller on said shaft, thereby permitting tipping of the roller parallel to said shaft, said roller being formed in a plurality of longitudinal sections rotatable about said shaft relatively to each other, and means maintaining said sections in axial alignment during said relative rotation thereof.

3. A lawn mower comprising a frame having a fixed bearing thereon, a shaft rotatably mounted in said bearing, a ground-engaging roller extending generally lengthwise of said shaft, a pivot extending transversely of the shaft and supporting said roller on said shaft, thereby permitting tipping of the roller parallel to said shaft, said roller being formed in a plurality of longitudinal sections rotatable about said shaft relatively to each other, and gears on said sections in constant mesh during said relative rotation.

4. A lawn mower comprising a frame having a fixed bearing thereon, a shaft rotatably mounted in said bearing, a ground-engaging roller extending generally lengthwise of said shaft, a pivot extending transversely of the shaft and supporting said roller on said shaft, thereby permitting tipping of the roller parallel to said shaft, said roller being formed in a plurality of longitudinal sections rotatable about said shaft relatively to each other, and means maintaining the axial spacing of said sections constant during said relative rotation.

5. A lawn mower comprising a frame having a fixed bearing thereon, a shaft rotatably mounted in said bearing, a ground-engaging roller extending parallel with said shaft and formed in a plurality of longitudinal sections rotatable about said shaft relatively to each other, a hub secured to said shaft with a universal connection, one of said sections being secured to said hub, and a differential connecting the other sections to said hub section while permitting said relative rotation.

6. A lawn mower comprising a frame having a fixed bearing thereon, a shaft rotatably mounted in said bearing, a ground-engaging roller extending parallel with said shaft, a hub mounted on said shaft with a universal connection, said roller comprising three longitudinal sections, means securing the central one of said sections to said hub, toothed pinions mounted on said hub concentrically with said shaft, rings secured respectively to the other sections and having teeth meshing with the teeth on said pinions, and means rotatably supporting said other sections on said hub with said teeth in engagement.

7. A lawn mower comprising a frame having a fixed bearing thereon, a shaft rotatably mounted in said bearing, a ground-engaging roller extending parallel with said shaft, a hub mounted on said shaft, said roller comprising three longitudinal sections, means securing the central one of said sections to said hub, toothed pinions mounted on said hub concentrically with said shaft, rings secured respectively to the other sections and having teeth meshing with the teeth on said pinions, and means rotatably supporting said other sections on said hub with said teeth in engagement.

8. A lawn mower comprising a frame having a fixed bearing thereon, a shaft rotatably mounted in said bearing, a ground-engaging roller extending parallel with said shaft, a hub mounted on said shaft, said roller comprising three longitudinal sections, means securing the central one of said sections to said hub, means rotatably supporting the other sections on said hub, and means preventing axial movement of one section with respect to the other.

9. A lawn mower comprising a frame having a fixed bearing thereon, a shaft rotatably mounted in said bearing, a ground-engaging roller extending parallel with said shaft, a hub mounted on said shaft with a universal connection, said roller comprising three longitudinal sections, means securing the central one of said sections to said hub, means rotatably supporting the other sections on said hub, and means preventing axial movement of one section with respect to the other.

10. A lawn mower comprising a frame having a fixed bearing thereon, a shaft rotatably mounted in said bearing, a ground-engaging roller extending parallel with said shaft and comprising two longitudinal sections, a hub secured to said shaft with a universal connection, one of said sections being secured to said hub to rotate therewith, means rotatably supporting the other section on the hub, and means preventing axial movement of one section with respect to the other.

11. A lawn mower comprising a frame having a fixed bearing thereon, a shaft rotatably mounted in said bearing, a ground-engaging roller extending parallel with said shaft and comprising two longitudinal sections, a hub secured to said shaft, one of said sections being secured to said hub to rotate therewith, means rotatably supporting the other section on the hub, and means preventing axial movement of one section with respect to the other.

12. A lawn mower comprising a frame supported by a ground-engaging roller, a wheel of substantially larger diameter than the roller, a sub-frame on which said wheel is rotatably mounted, means forming a pivotal connection between said frame and sub-frame, means preventing movement of the sub-frame axially of said pivot, a detachable driving connection between said wheel and said roller and operative when said wheel and roller are arranged concentrically to each other, means to swing said sub-frame on said pivot to bring said wheel and roller into axial alignment with each other or to swing them out of alignment, and means to lock said sub-frame in either one of said positions.

13. A lawn mower comprising a frame having a supporting roller therefor, a wheel of substantially larger diameter than the roller, a sub-frame on which said wheel is rotatably mounted, a pivot connecting said sub-frame to said frame and so disposed that upon swinging of the sub-frame about the pivot the axes of the roller and the wheel may be brought into alignment, means preventing movement of the sub-frame axially of said pivot, a clutch adapted to connect said roller to said wheel to drive one from the other, a stop adapted to stop rotation of the sub-frame on said pivot when said axes are in alignment, and means to lock said sub-frame to said frame when in that position.

14. A lawn mower comprising a frame having a supporting roller therefor, a wheel of substantially larger diameter than the roller, a sub-frame on which said wheel is rotatably mounted, a pivot connecting said sub-frame to said frame, and so disposed that upon swinging of the sub-frame about the pivot the axes of the roller and the wheel may be brought into alignment, means preventing movement of the sub-frame axially of said pivot, a clutch adapted to connect said roller to said wheel to drive one from the other, a stop adapted to stop rotation of the sub-frame on said pivot when said axes are in alignment, and means to lock said sub-frame to said frame when in that position, said locking means comprising a spring-pressed anchor slidably mounted on said frame and adapted to be actuated by said spring into a bore in said sub-frame.

15. A lawn mower comprising a frame having a supporting roller therefor, a wheel of substantially larger diameter than the roller, a sub-frame on which said wheel is rotatably mounted, a pivot connecting said sub-frame to said frame and so disposed that upon swinging of the sub-frame about the pivot the axes of the roller and the wheel may be brought into alignment, means preventing movement of the sub-frame axially of said pivot, a clutch adapted to connect said roller to said wheel to drive one from the other, a stop adapted to stop rotation of the sub-frame on said pivot when said axes are in alignment, means to lock said sub-frame to said frame when in that position, said locking means comprising a spring-pressed anchor slidably mounted on said frame and adapted to be actuated by said spring into a bore in said sub-frame, and means to hold said anchor in retracted inoperative position.

16. A lawn mower comprising a frame having a vertically extending side, a ground-engaging roller supporting said frame and disposed inwardly of said side, a shaft on said roller and projecting through an opening in said side of the frame, a sub-frame disposed outwardly of said side, a wheel of substantially larger diameter than said roller and having a bearing in said sub-frame, a pivotal connection between said frame and sub-frame so arranged that the axes of said roller and wheel may be brought into alignment with each other by movement of the sub-frame on said pivot, a clutch element on said shaft, and a cooperating clutch element slidably keyed to said wheel axially thereof and adapted to cooperate with said first-named clutch element to operatively connect the roller and the wheel to rotate one from the other.

17. A lawn mower comprising a frame having a vertically extending side, a ground-engaging roller supporting said frame and disposed inwardly of said side, a shaft on said roller and projecting through an opening in said side of the frame, a sub-frame disposed outwardly of said side, a wheel of substantially larger diameter than said roller and having a bearing in said sub-frame, a pivotal connection between said frame and sub-frame so arranged that the axes of said roller and wheel may be brought into alignment with each other by movement of the sub-frame on said pivot, a clutch element on said shaft, a cooperating clutch element slidably keyed to said wheel axially thereof and adapted to cooperate with said first-named clutch element to operatively connect the roller and the wheel to rotate one from the other, a spring normally urging said second-named clutch element towards said frame, and means to retract said second-named clutch element against the action of said spring.

18. A lawn mower comprising a frame having a vertically extending side, a ground-engaging roller supporting said frame and disposed inwardly of said side, a shaft on said roller and projecting through an opening in said side of the frame, a sub-frame disposed outwardly of said side, a wheel of substantially larger diameter than said roller and having a bearing in said sub-frame, a pivotal connection between said frame and sub-frame so arranged that the axes of said roller and wheel may be brought into alignment with each other by movement of the sub-frame on said pivot, a clutch element on said shaft, a cooperating clutch element slidably keyed to said wheel axially thereof and adapted to cooperate with said first-named clutch element to operatively connect the roller and the wheel to rotate one from the other, a spring normally urging said second-named clutch element towards said frame, means to retract said second-named clutch element against the action of said spring, and means on the frame adapted to engage said clutch element to hold said sub-frame in raised position with said clutch elements out of engagement.

19. A lawn mower cutter comprising side frames, a rotatable cutting element journaled in said side frames, a ground-engaging shoe extending between said side frames adjacent the bottom thereof, a stationary blade disposed above said shoe and having an edge adapted to cooperate with the rotatable cutting element, said edge being disposed forwardly of said shoe, an anchor member extending between said side frames adjacent the rear of said shoe, a plurality of brackets secured to said anchor member and extending forwardly therefrom towards said cutting edge of the stationary element, and means securing said shoe and stationary cutting element to said brackets.

20. A lawn mower cutter comprising side frames, a rotatable cutting element journaled in said side frames, a ground-engaging shoe extending between said side frames adjacent the bottom thereof, a stationary blade disposed above said shoe and having an edge adapted to cooperate with the rotatable cutting element, said edge being disposed forwardly of said shoe, a tubular anchor member extending between said side frames adjacent the rear of said shoe, a plurality of brackets secured to said anchor member and extending forwardly therefrom towards said cutting edge of the stationary element, and means securing said shoe and stationary cutting element to said brackets.

21. A lawn mower cutter comprising side frames, a rotatable cutting element journaled in said side frames, an anchor member extending between said side frames adjacent the bottom of the cutter, brackets spaced along the length of said anchor member and secured thereto and extending forwardly therefrom, a stationary blade having an edge disposed in front of said brackets and in position to cooperate with said rotatable cutting element, and means securing said blade to said brackets.

22. A lawn mower cutter comprising side frames, a rotatable cutting element journaled in said side frames, an anchor member extending between said side frames adjacent the bottom of the cutter, brackets spaced along the length of said anchor member and secured thereto and extending forwardly therefrom, a clamping member carried by said brackets, a ground-engaging shoe disposed beneath said clamping member and parallel thereto, a stationary blade adapted to cooperate with said rotatable cutting element and disposed between said clamping element and shoe, and means securing said shoe, blade, and clamping element together.

23. A lawn mower cutter comprising side frames, a rotatable cutting element journaled in said side frames, a ground-engaging shoe extending between said side frames adjacent the bottom thereof, a stationary blade disposed above said shoe and having an edge adapted to cooperate with the rotatable cutting element, said edge being disposed forwardly of said shoe, an anchor member extending between said side frames adjacent the rear of said shoe, a plurality of brackets welded to said anchor member and extending forwardly therefrom towards said cutting edge of the stationary element, and means securing said shoe and stationary cutting element to said brackets.

24. A lawn mower cutter comprising side frames, a rotatable cutting element journaled in said side frames, a ground-engaging shoe extending between said side frames adjacent the bottom thereof, a stationary blade disposed above said shoe and having an edge adapted to cooperate with the rotatable cutting element, said edge being disposed forwardly of said shoe, an anchor member extending between said side frames adjacent the rear of said shoe and welded in sockets in said side frames, a plurality of brackets extending forwardly from said anchor member and welded thereto, and means securing said shoe and stationary cutting element to said brackets.

25. A lawn mower cutter comprising side frames, a rotatable cutting element journaled in said side frames, a ground-engaging shoe extending between said side frames adjacent the bottom thereof, a stationary blade disposed above said shoe and having an edge adapted to cooperate with the rotatable cutting element, said edge being disposed forwardly of said shoe, an anchor member extending between said side frames adjacent the rear of said shoe and welded in sockets in said side frames, a plurality of brackets extending forwardly from said anchor member and welded thereto, and means securing said shoe and stationary cutting element to said brackets, said means including a clamping member integral with said brackets and between which and the shoe the stationary blade is disposed.

26. A lawn mower cutter comprising side frames, a rotatable cutting element journaled in said side frames, an anchor member extending between said side frames adjacent the bottom of the cutter, brackets spaced along the length of said anchor member and secured thereto and extending forwardly therefrom, a stationary blade having an edge disposed in front of said brackets and in position to cooperate with said rotatable cutting element, means securing said blade to said brackets, said means including a clamping member integral with said brackets, a shoe beneath said clamping member, and means holding the shoe and clamping member together with the stationary blade therebetween.

27. A lawn mower cutter comprising side frames, a rotatable cutting element journaled in said side frames, a ground-engaging shoe extending between said side frames adjacent the bottom thereof, a stationary blade disposed above said shoe and having an edge adapted to cooperate with the rotatable cutting element, said edge being disposed forwardly of said shoe, a tubular anchor member extending between said side frames adjacent the rear of said shoe and welded in sockets in said side frames, a plurality of brackets extending forwardly from said anchor member and welded thereto, and means securing said shoe and stationary cutting element to said brackets.

28. A lawn mower cutter comprising side frames, a rotatable cutting element journaled in said side frames, a ground-engaging shoe extending between said side frames adjacent the bottom thereof, a stationary blade disposed above said shoe and having an edge adapted to cooperate with the rotatable cutting element, said edge being disposed forwardly of said shoe, a tubular anchor member extending between said side frames adjacent the rear of said shoe and welded in sockets in said side frames, a plurality of brackets extending forwardly from said anchor member and welded thereto, and means securing said shoe and stationary cutting element to said brackets, said means including a clamping member integral with said brackets and between which and the shoe the stationary blade is disposed.

29. A lawn mower comprising a frame having a fixed bearing thereon with a shaft rotatably mounted in said bearing, a ground-engaging roller extending generally parallel with said shaft and comprising three longitudinal sections, a hub, a positive driving connection between said shaft and the central one of said sections, and differential drives between said central section and the other two sections.

30. A lawn mower comprising a frame having a fixed bearing thereon with a shaft rotatably mounted in said bearing, a ground-engaging roller extending generally parallel with said shaft and comprising three longitudinal sections, a hub, a positive driving connection between said shaft and the central one of said sections, differential drives between said central section and the other two sections, a wheel of substantially larger diameter than said roller, and means for securing said wheel to said shaft adjacent said central section.

31. A lawn mower comprising a frame having a fixed bearing thereon, a shaft rotatably mounted in said bearing, a ground contact wheel surrounding the end of said shaft, a universal connection between said wheel and the end of said shaft, whereby said wheel supports the shaft and frame and may be used to propel the mower and whereby said universal connection permits the wheel to tip out of parallel with the shaft, a pilot adjacent the outer end of said wheel and movable in a vertical guideway in said frame to limit said tipping of the wheel.

32. A lawn mower comprising a frame having a fixed bearing thereon with a shaft rotatably mounted in said bearing, a ground-engaging roller extending generally parallel with said shaft and comprising three longitudinal sections, a hub, a positive universal driving connection between said shaft and the central one of said sections, and differential drives between said central section and the other two sections.

HENRY J. STEGEMAN.